US008832063B1

(12) United States Patent
Dean

(10) Patent No.: US 8,832,063 B1
(45) Date of Patent: Sep. 9, 2014

(54) DYNAMIC REQUEST THROTTLING

(75) Inventor: Peter J. Dean, Oakland, CA (US)

(73) Assignee: A9.com, Inc., Palo Alto, CA (US)

(*) Notice: Subject to any disclaimer, the term of this patent is extended or adjusted under 35 U.S.C. 154(b) by 99 days.

(21) Appl. No.: 13/482,749

(22) Filed: May 29, 2012

Related U.S. Application Data

(63) Continuation of application No. 12/760,459, filed on Apr. 14, 2010, now Pat. No. 8,190,593.

(51) Int. Cl.
*G06F 17/30* (2006.01)

(52) U.S. Cl.
USPC .......................................... 707/707; 707/708

(58) Field of Classification Search
CPC .................. G06F 17/30864; G06F 17/30979;
G06F 17/30943; G06F 17/241; G06F
17/30716; G06F 17/30386; G06F 17/30595;
G06F 17/30557; G06F 17/30569; G06F
17/30873; G06F 17/30126
USPC ................................................. 707/707, 708
See application file for complete search history.

(56) References Cited

U.S. PATENT DOCUMENTS

| 7,970,775 | B2 | 6/2011 | Kelley et al. | |
|---|---|---|---|---|
| 2008/0034370 | A1* | 2/2008 | Huizenga | 718/104 |
| 2008/0319956 | A1 | 12/2008 | Ushiyama | |
| 2009/0299853 | A1* | 12/2009 | Jones et al. | 705/14.46 |
| 2011/0077997 | A1* | 3/2011 | Agarwala et al. | 705/10 |
| 2011/0153976 | A1* | 6/2011 | Tamura et al. | 711/170 |
| 2011/0213686 | A1* | 9/2011 | Ferris et al. | 705/34 |

* cited by examiner

*Primary Examiner* — Apu Mofiz
*Assistant Examiner* — Fariborz Khoshnoodi
(74) *Attorney, Agent, or Firm* — Novak Druce Connolly Bove + Quigg LLP

(57) ABSTRACT

Requests for resources can be throttled based on relative allocations, whereby the actual usage of a client or sub-client over time can be monitored in order to make intelligent throttling decisions. A centralized throttling service can maintain throttling information according to a hierarchical allocation tree, and can determine whether to throttle a request based at least in part whether any tokens, or available resource units, are available for a class or node of the tree corresponding to the request. In some cases, an empty token bucket for a node can borrow tokens from a parent node, in order to allow a user to exceed an allocation when the capacity of the system allows for such usage. When a user has been exceeding an allocation or otherwise inappropriately taxing various resources, the system can prevent that user from borrowing tokens for at least a specified period of time.

20 Claims, 5 Drawing Sheets

DYNAMIC REQUEST THROTTLING

CROSS REFERENCE TO RELATED APPLICATION

This application is a continuation of, and claims priority to, allowed U.S. patent application Ser. No. 12/760,459, filed Apr. 14, 2010, entitled "Dynamic Request Throttling," which is hereby incorporated herein by reference for all purposes.

BACKGROUND

As an ever-increasing number of applications and resources are being provided electronically, typically over networks such as the Internet, there is a corresponding increase in the number, types, and sources of requests received to various content providers. In many cases, different types of user will access similar resources provided by a common content provider. When one of these users sends an excessive number of queries, or queries that are very computationally expensive, the performance of the system providing access to the resources can be degraded for other users.

Conventional systems attempt to minimize the impact that one user can have on other users of a resource by throttling the number of requests that a user can submit over a specified period of time. In some cases, a user can get around this limit by running multiple instances. Even if a user cannot get around this limit, the queries submitted might be very computationally expensive, such that the user may be abusing the system even when the user is within the allowed number of requests.

Some conventional systems introduce queues of differing priority to provide levels of processing, and attempt to apply rules and policies to the received requests. Such an approach introduces latency to every request, however, and typically still relies upon static limits and determinations.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing resource usage in an electronic environment. In particular, various embodiments provide for dynamic throttling of various types of user requests using a centralized throttling service. A throttling service can track the usage of specific users and monitor, in real time, the amount of resource capacity being utilized by each user. The throttling service then can make intelligent decisions about whether to process the next request for that user, based at least in part upon the recent behavior of that user.

Such an approach does not rely on simple counts of how many requests people have sent, but instead determines the actual impact of each user, such as the actual amount of processing capacity that the user required over a previous period of time. The system can allow a user to send a large number of requests if those requests are not resource intensive, and can instead throttle users that are exceeding an allocated resource usage amount, independent of the number of requests received. The service can base throttling decisions on actual resource consumption.

A centralized throttling service can provide global throttling for a distributed environment where resources being managed may be spread across hundreds of different machines or more. The service can scale automatically as hardware is added or removed by monitoring heartbeats or other messages periodically sent from each device. Resource allocations can be assigned on a percentage or other relative basis, such that adjustments can be made quickly when the amount of available resource capacity changes due to a change in the number of available resources or other such occurrence.

A centralized throttling service can take advantage of hierarchical allocation trees, for example, wherein each incoming request is classified to a node of the tree. A decision whether to throttle the request can be determined based at least in part upon whether there are any tokens available for the classified node, where a token corresponds to a unit of capacity of the requested resource. In some cases, if there are no tokens available but the user's behavior meets certain favorable criteria, the throttling service can borrow tokens from parent nodes of the tree to enable the request to be processed. The throttling service can check each parent node from which tokens can be borrowed, up to a root node of the allocation tree. Various other approaches are provided within the scope of the various embodiments as described and otherwise suggested herein.

Figure 1:
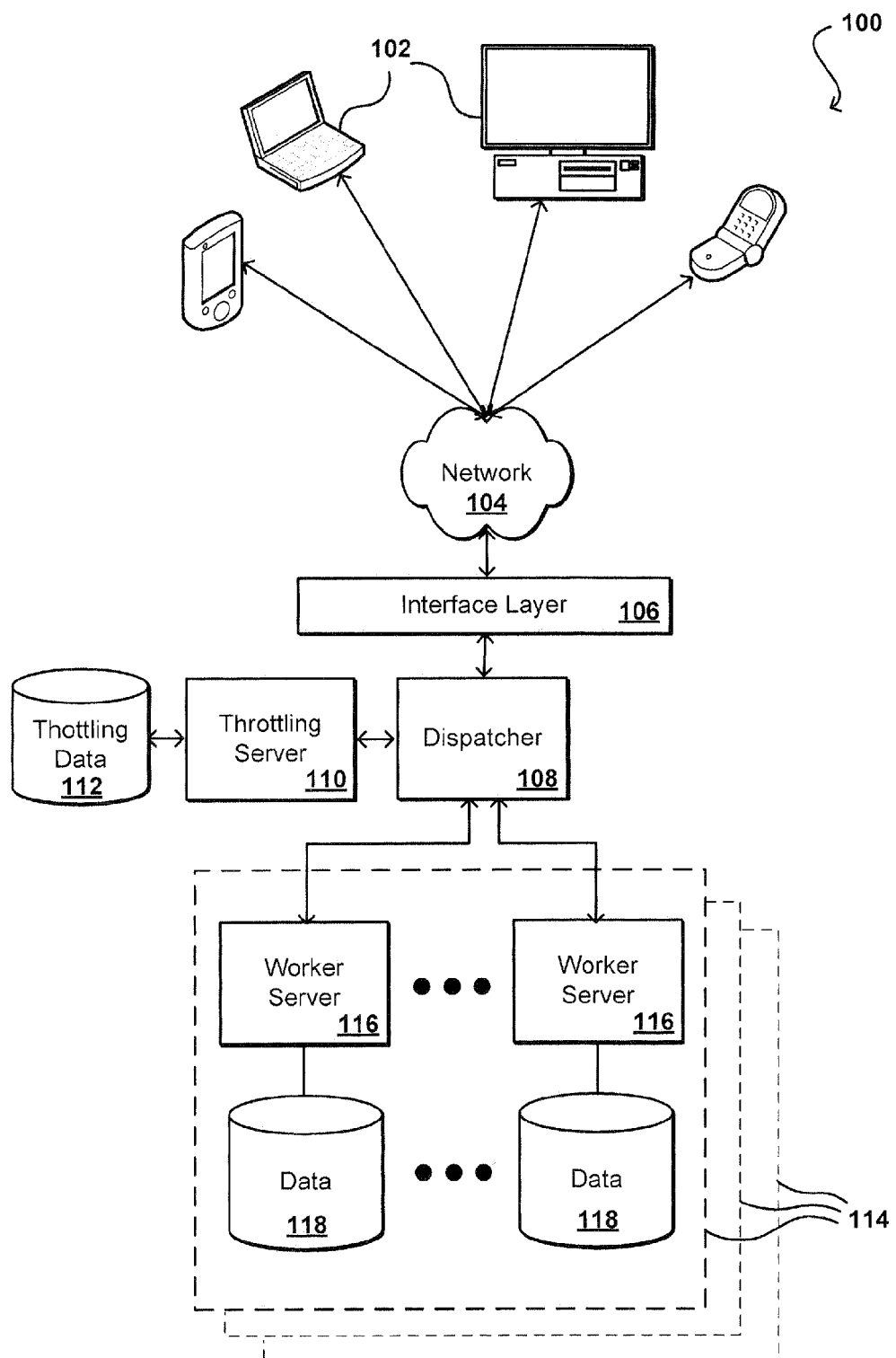
FIG. 1 illustrates an environment in which various embodiments can be implemented.

FIG. 1 illustrates an example of an environment 100 for implementing aspects in accordance with various embodiments. As will be appreciated, although an Internet-based environment is used in various examples discussed herein for purposes of explanation, various other network-based environments may be used, as appropriate, to implement various embodiments. The environment 100 shown includes a plurality of electronic client devices 102, which can include any appropriate device operable to send and receive requests, messages, or information over an appropriate network 104 on behalf of at least one respective user, and convey information back to a user of each device. Examples of such client devices include personal computers, cell phones, personal data assistants, and laptop computers, as shown, as well as other devices such as set-top boxes, handheld messaging devices, electronic book readers, media players, video game consoles, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes an interface layer 106 which can include any appropriate components for receiving and routing requests, such as may include one or more application programming interfaces (APIs), routers, and Web servers for receiving requests and serving content in response thereto, although for other networks alternative devices serving similar purposes could be used as would be apparent to one of ordinary skill in the art.

The illustrative environment includes at least one dispatcher 108, which can include any appropriate module, device or system for dispatching or otherwise routing requests, such as may include a dispatching service operating on at least one application server. A dispatcher 108 can receive requests from the interface layer 106 and direct the requests to the appropriate resource 114. In some embodiments, the request can be a distributed request that is executed in parallel across a large set of worker servers 116. The dispatcher 108 in such an embodiment can comprise a collator operable to collate the results from each of the set of worker servers. As shown, there can be several different resources 114 and/or instances of the same type of resource. In the example shown, the resource relates to a service wherein requests can be directed by the respective dispatcher 108 to at least one worker server 116 in communication with at least one data store. It should be understood that there can be several application servers, layers, or other elements, processes, or components, which may be chained or otherwise configured, that can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. Each application server can include any appropriate hardware and software for integrating with a respective data store as needed to execute aspects of one or more applications for a client device, handling a majority of the data access and business logic for an application. Each application server can provide access control services in cooperation with the data store, and is able to generate content such as text, graphics, audio, and/or video to be transferred to the user, which may be served to the user by the interface layer 106 in the form of HTML, XML, or another appropriate structured language in this example. The handling of all requests and responses, as well as the delivery of content between a client device 102 and the dispatcher 108 can be handled by the interface layer. It should be understood that Web and application servers are not required and are merely example components, as structured code discussed herein can be executed on any appropriate device or host machine as discussed elsewhere herein.

The environment in this example also includes at least one throttling server 110 in communication with at least one data store 112 containing data useful for making throttling determinations. As should be understood, the throttling data can be stored in a separate data store or as a table or other grouping of content within one of the other data stores of the environment. Each time the dispatcher 108 receives a request, the dispatcher can contact the throttling server 110, or a throttling service executed by at least one throttling server, in order to determine whether to forward the request for processing, and/or how to process the request.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

In one example, a system such as that described with respect to FIG. 1 can provide the capability to search for any of a variety of types of content or information stored by the various data stores. Further, the requests (e.g., search queries) can be received from users that are external to the content provider, such as end users of a site provided by the content provider or third party providers, as well as users that are associated with the content provider. In the example of an electronic marketplace, a user can submit a query to receive a list of products or services offered through the electronic marketplace (either from the content provider or a third party) that match the submitted query. There can be a large number of users, of different types, that can concurrently submit queries to be processed by the content provider system. Further, these users can access different types of resources or content, such as customers searching product information for the electronic marketplace, third party users accessing web services offered by the content provider, and internal customer building or testing applications. In many instances, a vast majority of these users will effectively touch the same services or resources with no significant isolation between the users. Thus, if any of the users begin to perform undesired behaviors, such as to submit a persistent or long-running set of queries that are computationally expensive for the system, that user can degrade the quality of service provided for the other users of the system. As discussed above, conventional throttling approaches attempt to restrict the number of queries a client can send over a given time interval, but such approaches are limiting and do not provide for dynamic or intelligent decision making.

When a query is received by the content provider system, the query (or information for the query) can be forwarded to a collator, or another dispatcher, which in some embodiments will dispatch the query in parallel to a large number of partitions, such as slices of an overall search index. In a search for books, for example, there can be a search on sixty-four different machines, with one machine (e.g., partition server) for each of the sixty-four slices of the index that are involved in executing the query. In this example, the resource allocation to be protected is the usage of the partition servers. In some system each server can make a determination as to whether that server can accept a request, but there can be problems with consistency across sixty-four different machines. Further, since there can be many replicas of each slice of the index, each of which can have a local view of user activity, it can take a long period of inappropriate behavior by a user before all the replicas detect the problem. Thus, it can be desirable to make the decision "upstream" of the servers, such as at a collator module, before multiple instances of the query are dispatched in parallel to the various partition servers.

Systems and methods in accordance with various embodiments instead track the usage of at least a portion of the users utilizing the system, such as may include high usage customers or customers paying for specific qualities of service. The system can monitor usage for each of these users in real time and make intelligent decisions about whether or not to service requests from that user based at least in part upon the past performance of that user. Instead of throttling a user based on a number or rate of requests, for example, the system will monitor based on the actual resource allocation (e.g., CPU usage) needed to execute the requests for that user. Since queries can vary by four orders of magnitude or more in processing requirements, 1,000 relatively "cheap" requests can require less processing capacity than a single expensive request. Thus, it can be advantageous to track the actual resource consumption instead of the number of requests, as a user submitting fewer but more expensive requests can actually consume significantly more resources than a user submitting a large number of cheap requests.

Further, different users will submit requests to access different services or types of resource. The provider might want to provide some control over the amount of use of specific services, such that more important or profitable services might be at least somewhat isolated by abuses of lesser services. In at least some embodiments, a provider can assign and manage relative allocations of various resources to each service, application, or other such component.

Figure 2:
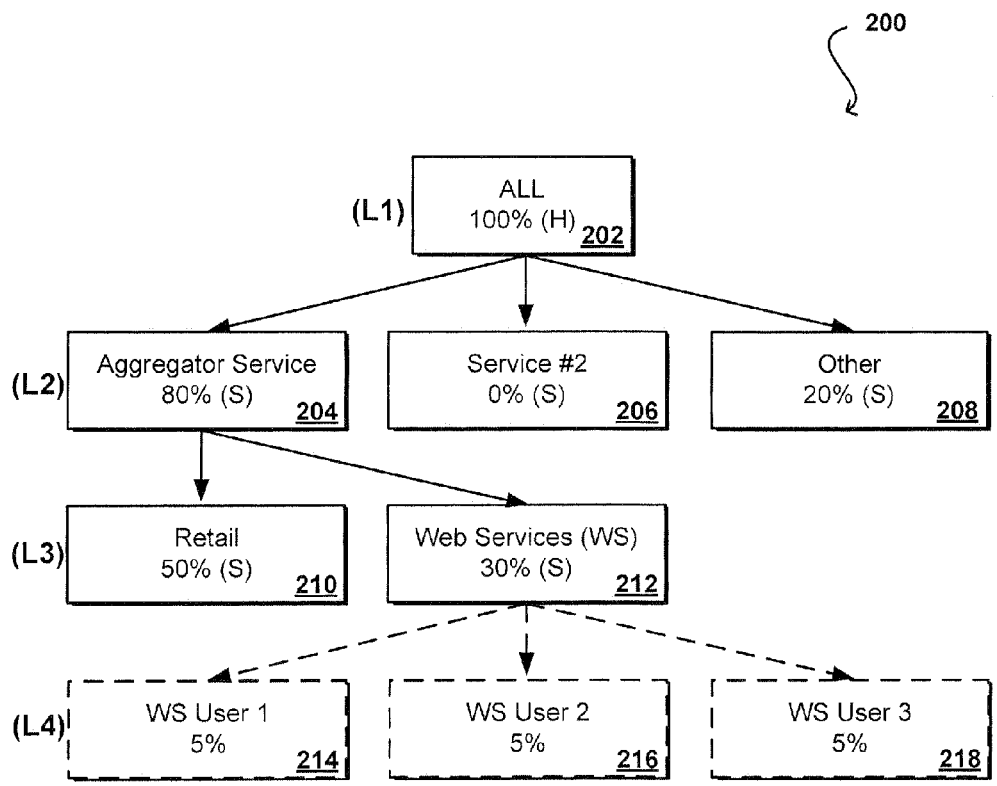
FIG. 2 illustrates an example hierarchical allocation tree that can be used in accordance with various embodiments.

FIG. 2 illustrates an example configuration 200 wherein various services, users, clients, or other such entities are classified according to a hierarchy comprising multiple levels of nodes. In this example, there is a top-level node 202 at the first level (L1) in the hierarchy that is associated with all applications, services, modules, or other locations to which a request can be associated, at least with respect to those elements addressed in the hierarchy. At a second level of the hierarchy (L2) under the top-level node 202 is contained a set of services, including an aggregator service 204 useful for aggregating requests, for example, as well as at least one additional service having a dedicated node 206 assigned. All other services at the same level can be lumped into a default node 208 used to allocate requests to any service at that level that does not contain a dedicated node. Since there is a single root node at L1, the child nodes at L2 can inherit the 100% allocation from the parent node 202. The system can assign an allocation to each node, such that the aggregator service node 204 receives an allocation of 80% of the processing capability, the node for service #2 206 receives 0% of the allocation, and the node for the remaining services 208 receives the remaining 20% allocation.

At the third level (L3), each of the nodes shown is a child node of the node corresponding to the aggregator service 204. Thus, a node 210 for the retail traffic and a node 212 for the web services traffic inherit, and split, the 80% allocation for the parent node 204. The retail node 210 is allocated 50% of the overall capacity, and the web services node 212 is allocated 30% of the overall capacity. As should be understood, each child node could alternatively be assigned a percentage of the allocation of the parent node instead of the overall allocation, such that the allocation from each parent node would total 100%. In this example, there is also a fourth level (L4) that contains virtual nodes 214, 216, 218 wherein specific users can each be assigned an allocation from the parent node 212, such as where a specific user is to receive a specific quality of service. Typically each node represents an entire class, but virtual nodes (in L4) can be utilized where individuals or other entities within a class are to be considered separately from other users within that class. Thus, each virtual node is not a true class node but is a special case or allocation within the class of the parent node.

Before a request is processed according to this hierarchical allocation tree in some embodiments, a component such as the interface or dispatcher can first determine the client or user associated with the request in order to attempt to classify the request. Various other types of information or determinations can be used as well as can be beneficial for classifying requests according to any of a number of simple or complex allocation schemes, which can include a number of absolute and/or relative allocations. In some embodiments, each user or client device is instructed to include an identifier (e.g., a user ID or session ID as a field value of a request) in order to access the requested resource, service, or content. In some embodiments, a token is to be provided with each request. Since there also can be a number of intermediate services between the user and the content provider system, the request also can include an additional identifier (e.g., a sub-client ID) enabling the content provider system to also identify any intermediate services for purposes of determining resource usage or other aspects associated with an intermediate service. For each request, there can be multiple allocation determinations based not only on usage by the user, client, or application generating the request, but also usage by any intermediate service along a transmission path between the client and the content provider. In one embodiment, a throttling service performs a determination process for each identifier included with the request, although in other embodiments only specific identifiers might be analyzed.

By implementing such an approach, a content provider can allocate any available resource by percentage, fraction, or other relative allocation, which can be managed and determined dynamically. As should be understood, additional and/or alternative allocations or determining factors can be used in other embodiments. By utilizing percentages or other relative allocations, the system can also dynamically adjust the allocations when additional resources are added to the system, such that the additional resources can be automatically visible as soon as they are available, and the system can allocate portions of that resource using the relative allocations already established for that resource. For conventional systems that utilize fixed numbers for allocations, the addition or removal of resources can lead to complex determinations and mappings of requests to specific resources, or other such determinations.

Figure 3:
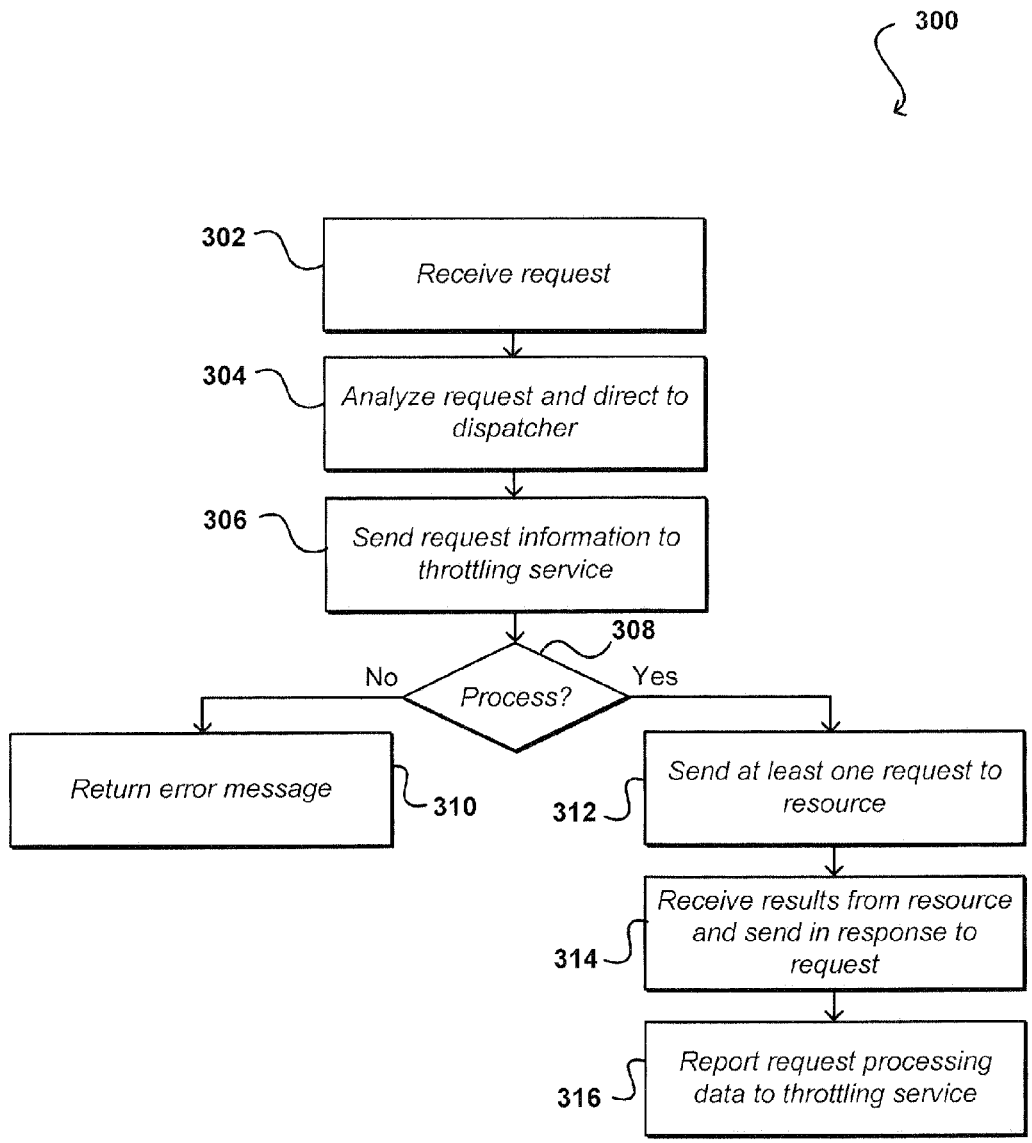
FIG. 3 illustrates an example of a process for determining whether to process a request that can be utilized in accordance with various embodiments.

FIG. 3 illustrates an example process 300 for processing requests that can be used in accordance with at least one embodiment. It should be understood that for each process discussed herein, there can be additional, fewer, or alternative steps performed in similar or altering orders, or in parallel, unless otherwise stated, within the scope of the various embodiments. In this example, a request is received from a user to an interface layer of a content provider system 302. The request is analyzed and, where the request requires access to an access-managed resource, the request (or information for the request) is directed to a dispatcher 304. The dispatcher sends information about the request to a throttling service 306, or similar system or service, to determine whether or not to process the request 308. The throttling service can analyze the recent historical usage of each identifier associated with the request to determine whether any of the identifiers exceed a usage threshold or other such aspect as discussed elsewhere herein. If the usage for at least one identifier meets or exceeds a usage threshold, or other such criterion, the dispatcher will receive a response from the throttling service not to process the request, and the dispatcher can cause an error message, or similar information, to be sent back to the user or device generating the request 310.

If the throttling service determines that, according to at least one hierarchical allocation tree or other such allocation information, each of the identifiers associated with the request is within an allowable usage range, or other such criterion, the dispatcher can receive a response from the throttling service to process the request. The dispatcher can send at least one request to at least one appropriate resource for processing 312. As discussed above, the request in some cases can be a distributed request which the dispatcher will send to multiple servers or other components in parallel. The dispatcher can receive the results from each resource receiving a copy of the request, and can send the results back to the user as a response to the user request 314. The dispatcher also can report information to the throttling service regarding the processing of the request, such as the amount of resources that were necessary to process the request 316, which can be used for future determinations with respect to any identifier associated with the request. It can be desirable in at least some embodiments to store the historical processing information, as the system typically will not be able to predict how resource intensive, or "expensive," a request will be before the request is processed. It therefore can be desirable to instead react based at least in part upon a user's past behavior in order to limit the future behavior of the user. Any appropriate time limits, curve smoothing, or other such adjustments can be made such that the system can balance being reactive, to quickly throttle users, versus looking at longer periods of performance, to prevent throttling users in response to short spike of increased activity, or other such occurrences.

It can be desirable in at least some embodiments to ensure that each worker server is available before the dispatcher sends out a request, in order to avoid the need to re-process portions of a request or otherwise waste resources or cause undesired delays. In some embodiments, each worker server or other such resource component periodically sends a "heartbeat" message, such as once a second, that includes information such as capacity, utilization, health, status, or other information. In at least some embodiments, the heartbeat messages include information about the resources available for that server, such as the number of CPUs currently available in the server, and in some cases the speed of the CPUs or other such useful information. Each server can be configured to automatically start heartbeating as soon as the server is available to the system, such that the throttling system and dispatcher can automatically begin processing requests using the new server. Any of a number of mechanisms can be utilized to determine whether each worker server is still available, such as a load balancer or other mechanism known or subsequently developed for such purposes.

The throttling service can use information from the heartbeats to update the throttling information stored in memory. As discussed, the throttling service can store a hierarchical allocation tree that includes a plurality of nodes at different levels, each node having a specified allocation. Each of these nodes can be thought of as a bucket that is able to hold up to a maximum number of "tokens." Each token can correspond to a unit of resource capacity, as can be determined and updated using the heartbeat information. For example, a token could correspond to a unit of memory usage, I/O resources, disk usage, resource connections, threads, processes, or other standard system-level resources. A throttling service can maintain separate trees and buckets for each resource (or type of resource) being managed, and can receive appropriate heartbeat information for use in managing the resource allocation. Typically, allocation trees are homogeneous and contain only a single type of token, although certain combinations are possible.

The capacity of each bucket can be based, at least in part, upon the allocation (e.g., percentage) assigned to that bucket, as well as the resource capacity (e.g., number of tokens) currently available. The capacity of a bucket can be defined in any of a number of different ways. In one example, a bucket might have N tokens added to the bucket at each interval, such as every second. N can be based on the number of CPUs multiplied by the number of partition servers (at least in a homogeneous environment). The bucket can hold at most M tokens, where M is equal to N×F, F being a factor relating to a period of time, for example, allowing for short bursts by individual clients. When the bucket is full, additional tokens are discarded.

When a request is received by the system, a dispatcher or similar component can contact the throttling service to determine whether the system should process the request. The throttling service can classify the request to the appropriate node in the allocation tree, and determine whether there are any tokens (or available capacity) for that client in the bucket at the moment. If such tokens are available, the throttling service can indicate to the dispatcher that the request can be executed. If the necessary tokens are not available, the throttling service can respond to the dispatcher that the request should not be processed.

In some embodiments, however, the throttling service can analyze other nodes or levels of the tree to determine whether unused tokens exist that can be "borrowed" by the current node for a request. If a user is given a small allocation, for example, the system might be willing to allow the user to exceed that allocation for at least a specified period of time if resources of the system are idle or otherwise underutilized. If the system is at or near maximum operating capacity, however, the system might not allow the user to exceed the allocation.

Figure 4:
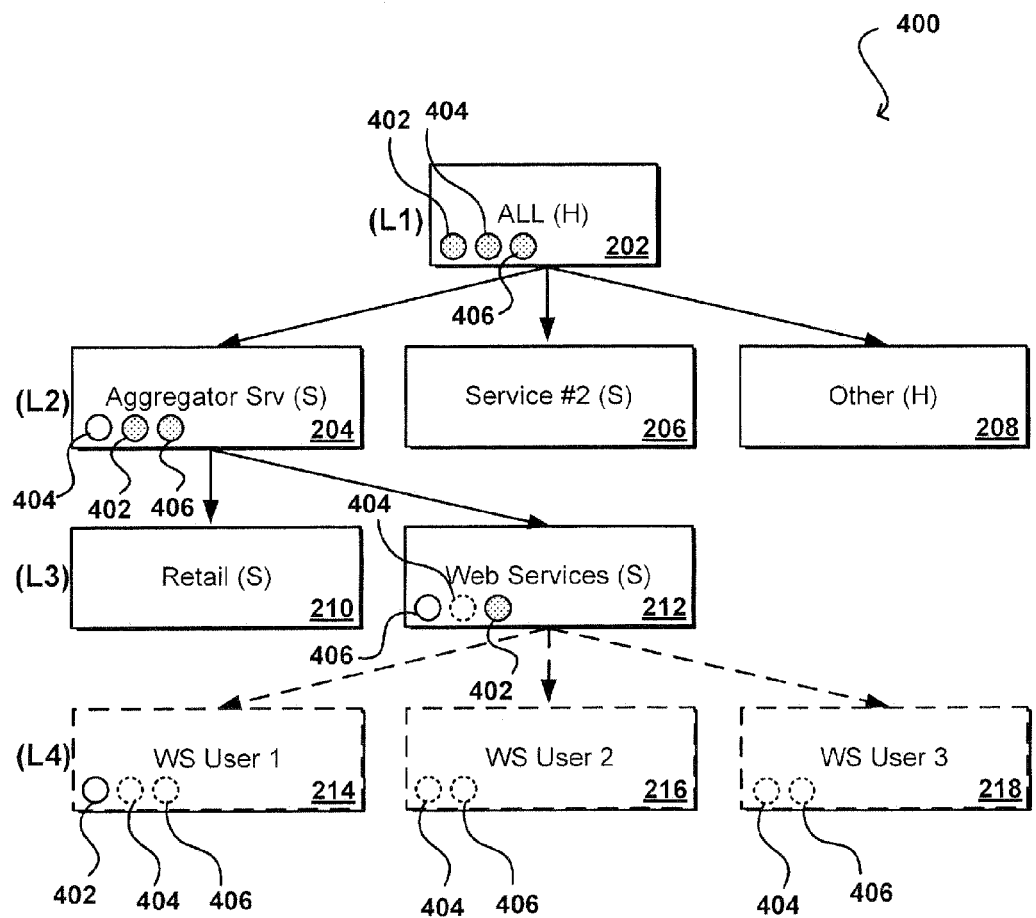
FIG. 4 illustrates an example hierarchical allocation tree allowing for token borrowing that can be used in accordance with various embodiments.

FIG. 4 illustrates an example allocation 400 wherein available tokens are shown for various nodes of the hierarchical allocation tree. Each available token for a specific node is illustrated as a solid circle with a solid line. As can be seen, the virtual node for WS User #1 214, the Web services node 212, and the Aggregator Service node 204 each contain one available token for that specific node (402, 406, and 404, respectively). In this example, the node for WS user #2 216 does not contain any available tokens, and thus in some embodiments would not be able to have a request processed by the system at the present time.

The node for WS User #2 216 is a child node of the Web services node 212, however, which has an available token that is not being used. It at least some embodiments, the throttling service can "borrow" a token from the parent node in order to process a request for the current node. And the process can be recursive, as the parent might not have an available token, but a parent node of that parent (e.g., a node two or more levels up from the current node) might have a token that can be borrowed. The tokens that can potentially be borrowed from a parent node are illustrated as circles with dotted lines. Thus, the throttling service can take a recursive approach wherein for a given node, the throttling service can keep moving "up" the tree until an available token is located, or the top node is reached and a determination is made that there are no tokens available. As can be seen, each of the nodes of L4 can borrow up to two tokens, one from the parent Web Services node 212 and one from the parent Aggregator Service node 204 of L2. Also illustrated in FIG. 4 is the fact that although specific tokens might be allocated to specific nodes, those tokens also are technically available to the parent nodes of the tree.

As a first example of how tokens can be shared among nodes, a first token 402 is allocated to virtual node 214. The token also appears as available to each of the parent nodes 212, 204, 202 for that virtual node, even though the token is assigned to the virtual node 214. In some cases, unused tokens of a particular node can be considered as available to one or more of the parent nodes, and thus can potentially be borrowed by another child node of one of those parent nodes.

A second example shows a token 404 allocated specifically to node 204, but this token also shows as available to parent node 202, and can be borrowed by child nodes 212, 214, 216, and 218. Another token 406 is allocated to node 212, but this token 406 shows as available to parent nodes 202 and 204, and can be borrowed by child nodes 214, 216, and 218. In cases where a token is used by a parent node (or a child of a parent node), some systems will remove that token from the dedicated node. It other systems, it can be necessary to examine nodes up to the parent node to ensure that no higher-level node has provided that token to another node, such that even though the token appears in a node it might no longer be available as it has been reallocated by a parent node. Various other reallocations can be utilized as well within the scope of the various embodiments.

The availability of tokens to parent nodes can be based at least in part to the way in which the tokens are allocated. For example, the set of all available tokens can first be associated with the parent node 202, and the tokens can then be distributed to the child nodes 204, 206, and 208. The tokens for each of these nodes then can be distributed to their child nodes, and the process can continue down the tree until all tokens are distributed. Each of the tokens can still be thought of as being also assigned to each of the parent nodes which at some time had that token associated, before the allocation flowed to a lower level in the tree. Each parent node then will, by definition, have at least as many tokens as are allocated to the child nodes of that parent.

In some cases, the system might not want a node to be able to borrow above a certain level of the hierarchy. For example, the system might allocate the Aggregator Service node 80% of the available resources, and allow any child node of the Aggregator Service to borrow any of that 80%. The system might not, however, allow the Aggregator Service to exceed its 80% allocation. These different types of allocation will be referred to herein as having a "soft" cap, wherein a node can borrow tokens from a parent node, or a "hard" cap, where a node is limited to its respective allocation.

In the example of FIG. 4, each node is shown as having a hard cap (H) or a soft cap (S). The top node 202 by definition will have a hard cap, as the top node is not able to borrow from any parent node. The Other node 208 of L2 also has a hard cap in this example, such that the "other" Web services for that node are unable to borrow available tokens from the parent node. These other Web services then could be throttled even when the parent has available tokens. In addition to enabling certain nodes to borrow tokens during periods of lower activity, for example, such an approach also enables specific nodes to process request only when resources are available. For example, in FIG. 2 it was shown that the node 206 for Service #2 is set to 0% allocation, but with a soft cap. With these settings, requests for Service #2 can only be processed when there are available tokens to be borrowed from the parent node. During periods of peak activity, the system will not process requests for that service. This approach can be used for lower priority services, which might not be allowed to run at peak usage in order to maximize the amount of resources available to the more important services.

Figure 5:
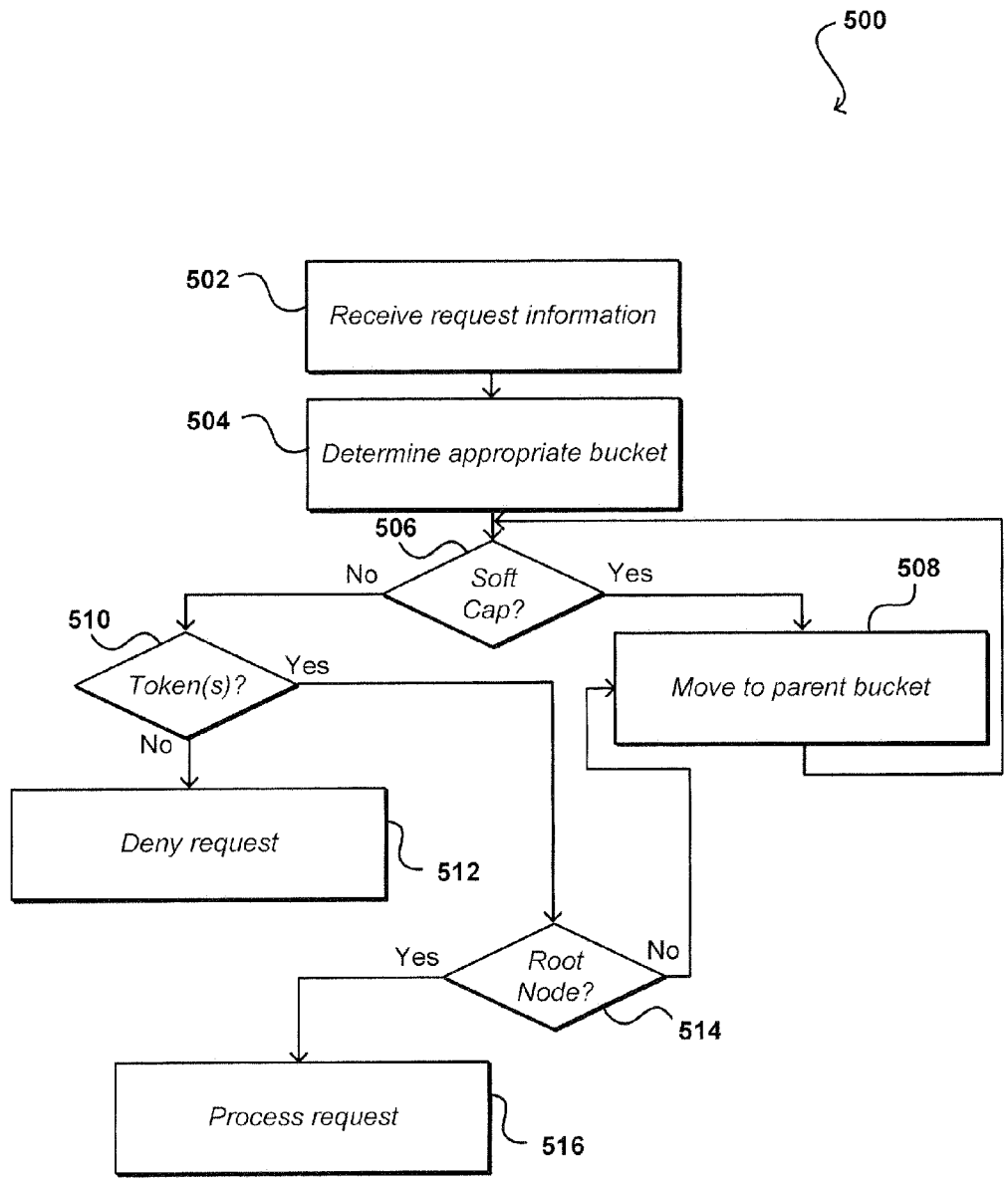
FIG. 5 illustrates an example of a process for borrowing tokens that can be utilized in accordance with various embodiments.

FIG. 5 illustrates an example approach 500 for processing requests by borrowing tokens that can be used in accordance with at least one embodiment. In this example, request information (which may include at least one identifier) is received from a component such as a dispatcher of a content provider system to a throttling service 502. The throttling service analyzes the information and determines the correct bucket of the hierarchical allocation tree (e.g., based at least in part upon the identifier(s)) for the request 504. The throttling service determines whether the current bucket has a soft cap 506. If the current bucket has a soft cap, the system moves to the parent bucket 508 and performs a similar determination 506. This process can continue recursively until a bucket is reached that does not have a soft cap. When a current bucket does not have a soft cap, a determination is made as to whether at least one token is available in the current bucket 510. If no token is available in the current bucket, the request is denied 512, and an error message can be returned or another appropriate action taken. If there is at least one token available in the current bucket, a determination is made as to whether the current bucket corresponds to the root node 514, or is otherwise determined to be the top-level bucket. If the current bucket has a token and corresponds to the root node, the request is processed 516. If the current bucket does not correspond to the root node, the throttling service can again look to the parent node in the next highest level of the allocation tree 508 and the process can continue recursively until either the request is processed or the throttling service reaches an empty bucket with a hard cap, whereby the request is denied. As should be understood, various other criteria can be considered as well at various points in the process.

As an example, the throttling system can determine whether any particular node in the tree has recently been over its allocation. When the root node gets to zero tokens, the system can begin enforcing policies, allocation limits, and other rules or factors, such that clients who have recently exceeded their allocation can be limited while clients who have not exceeded their allocation for a recent period of time can continue to borrow tokens from parent nodes when available. Soft nodes in many embodiments would only be throttled when tokens are otherwise available when those nodes have recently been oversubscribed or otherwise over a specific allocation.

Referring back to FIG. 4, the L4 users are described to have "virtual nodes" 214, 216, 218. For the Web Services node, there might be tens of thousands of concurrent users who each are able to get at least one token. There can be certain users, however, for which the system might want to ensure a minimum allocation. The system in one embodiment can assign each of these users a virtual node, which functions as a node in the tree but can be managed separately. In other embodiments, the system might assign each new or designated user a virtual node that can be removed if the user does not send another request within a specified period of time. Such an approach enables the system to bound the number of nodes in the allocation tree at any time. All traffic for each virtual node thus can be treated as a separate instance of the respective parent node.

A throttling system in accordance with at least some embodiments can keep a running average of the usage associated with each client ID or sub-client ID. By tracking running averages over a period of time, users will not be punished for briefly exceeding their allocation, sending expensive queries, or for any other such action. As discussed, the length of the period can be adjusted in order to balance the ability to quickly react to a user who is exceeding capacity with the desire to prevent users from being throttled for minor infractions of their respective allocation. In some embodiments, requests are allowed to be processed up to a specified or threshold multiple of the running average.

Each node can have a pattern assigned that is essentially a regular expression that will be executed on the request. Requests will often be run on the client ID or sub-client ID fields of the request, but more generic instructions can be supported in certain embodiments. In one example, the system could determine that queries executed using a certain generic word are going to be more expensive on average, such that a pattern could be written to grant a special allocation to any received queries that include that keyword. The cost of such an approach can be proportional to the number of patterns being run, such that a system administrator might want to limit the number of patterns at any given time. The administrator also might want to minimize the number of nodes in the tree, as each of these patterns might have to be executed for each node each time a new request arrives. In some embodiments, the patterns are advantageously run starting from the bottom of the tree, based at least in part upon the assumption that most queries will match one of the "leaf" nodes of the tree, or a node with no child nodes but at least one parent node, and the average number of patterns needed to be run thus can be minimized. An example of a pattern is given by:

field-client_ID=x, where x is a 16 character hex string, followed by a human-readable identifier such as "WS".

In some embodiments, throttling and/or usage information can be logged or otherwise stored for analysis, enabling various statistical calculations or reports to be generated. In some embodiments, alarms or other remedial or notification actions can be triggered based at least in part upon the information stored in the logs. In one example, information for specific nodes can be dumped to the log periodically, such as every ten seconds. The information can be analyzed in real-time, periodically, or at manually-determined intervals. Such information also can be used by other services or cradles that monitor various data to ensure that services are running properly, or whether an action such as a restart or other action should be taken (such as where no requests are being received for an otherwise busy service).

In some embodiments, multiple services can be utilize to split the traffic while maintaining proper allocation and usage information. In one embodiment, each data center for a provider can maintain a separate throttling service where the workload is spread relatively evenly across data centers using at least one routing approach.

Further, in cases where independent subsystems can be identified, for example, the system can allow for partitioning by view. There can be many separate indexes that users can search. A collection of indexes on a common set of physical hardware is referred to herein as a "view." The system can manage the resources of an individual view, as that set of machines is used to execute particular queries. If there are 100 views in the system, there could be 100 separate throttling services, servers, etc. Since a fleet of servers that searches for electronics-related content can be different than a fleet of servers that searches for book content, the resources can easily be separated and managed by view. Discovery of the throttling service for each view can be performed through a CNAME, with the name derived from a role or view assignment, for example. In the event of a crisis, the CNAME can be changed and a failover operation can quickly be performed to failover to a new throttling server.

In order to better understand some of the above processes, the following presents a specific hierarchical class-based throttling algorithm that can be used in accordance with various embodiments. As discussed, a tree is maintained for each view and exposed to all respective dispatchers in the system. Each node in the tree can represent a "class" of traffic (e.g., queries), where each class of traffic is defined by three pieces of information:

1) A pattern for identifying traffic belonging to this class.
    2) An allocation of resource capacity (e.g., CPU), as a percentage of all resource capacity available in this view.
    3) A boolean representing whether the allocation is "hard" or "soft."

A token bucket associated with a class of traffic is considered to be "oversubscribed" when the bucket has been recently empty, and this fact can be recorded with a flag associated with each class. This flag can automatically be cleared after a few seconds.

When a query arrives at the dispatcher, the following example algorithm can be performed:

1) Classify the query to a class using a throttling tree. Set a "was_oversubcribed" flag if this class was recently oversubscribed. This flag is not cleared if the system recurses through non-oversubscribed nodes.
    2) If the current node is "soft" then recurse and check the parent node.
    3) If the current node has no tokens then throttle the query and return an error.
    4) If the system is at the root, and if both a "was_oversubcribed" flag and the root's "oversubscribed" bit are set, throttle the query and return an error.
    5) Else, if at the root then execute the query.
    6) If both the was_oversubcribed flag and the current node's oversubcribed flag are set then throttle the query and return an error,
    7) Otherwise recurse and check the parent node.

After a query completes the following steps can be performed:

1) Calculate the actual cost of the query based on the cost reported by each partition.
    2) Deduct the cost of the query from the token bucket for its class and recursively from each of its ancestors (ignoring empty buckets).
    3) If the bucket for any class is now empty then mark the oversubscribed flag on that class.

Each of these classes can represent single clients, as each class has a pattern and all queries that match that pattern can be throttled as a single entity. These can be separate clients, however, where a pattern matches a group of queries and where each such query should be treated as a separate entity and throttled independently. For example, individual Web services users might each be provided with a separate "virtual" class, corresponding to the virtual nodes discussed above. A virtual class can be used to provide at least a portion of the Web services users with their own small resource allocation. Since there will not automatically be a class in the tree for each member of a virtual class, the classes can be created dynamically the first time each member is encountered. In order to scope the overall size of the tree, these can be expired after some period of inactivity as discussed above. The first time a member of a virtual class is encountered, the system can check and charge the query against the virtual classes parent, or perform the regular processing as if this query had originally matched the parent. A new node then can be added to the tree for this virtual client, and tokens can be added to this class as for other classes. Once a virtual node has been added to the tree it is treated like any other node, except that if no queries are charged against the node in N seconds the node can be pruned.

In some embodiments, a centralized data store is utilized to house the throttling data. This can take the form of, for example, a centralized throttling service with an accompanying client library. Depending upon the implementation, the breakdown of work between the client library and the service may vary. Logical operations for such a centralized service can include:

1) ShouldQueryBeThrottled (query): for use by the dispatcher before executing a query.
    2) ChargeQuery (query, cost): for use after the dispatcher has executed the query.
    3) AddTokens (num_token): for use by partition servers every interval.

The first two functions can each be called for every non-throttled query, and the AddTokens() call can be issued all the time from each partition server. Since the throttling configuration information is fundamentally split per view, it would be trivial to partition the service per view.

Because the token buckets can be distributed, it can be difficult to determine the maximum capacity. The cap can be proportional to the number of partition servers, which can be continually varying. In one approach, the throttling service can track how many tokens have been recently added and adjust a cap dynamically based on how many tokens are arriving. If the bucket capacity can be expressed in terms of seconds of total CPU (or other processing units) to recall, the partition servers can add tokens to "sub-buckets" for each interval. Each interval can have a new sub-bucket, and the system can remember the last N intervals. This complicates the charging of each query, as there can be a need to span multiple sub-buckets, but the CPU available will automatically vary as boxes arrive and depart.

In some embodiments, a token "accumulator" can run on each partition server. The accumulator can wake up every interval (e.g., once a second) and add CPU seconds (e.g., milliseconds) equal (or related) to the number of CPUs to the throttling service. This can comprise a python (or similar) process running on each machine, with an important consideration being to ensure that this process both starts when a machine goes into service and stops when the machine leaves service.

Various embodiments also can take advantage of certain performance optimizations with respect to the throttling service. For example, ChargeQuery calls from the dispatchers can be batched to shrink the request rate. In some cases, calls such as ShouldQueryBeThrottled and ChargeQuery can be combined into a single call, whereby the last query for a client can be charged and the system can determine whether to throttle the next request, thus reducing the request rate in half.

At least one logical application programming interface (API) enables all throttling-specific logic in the throttling service to be localized. The dispatcher client and the accumulator do not need to know anything about the throttling trees, which simplifies the client implementation. However, there may be certain advantages to performing client classification on the client, such as by assigning a query to a particular client node in the tree. This approach could both reduce CPU usage on the server and reduce message size in the communication protocol. This can be essential where certain protocols options, such as UDP, are implemented.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system comprising:
   at least one processor; and
   a memory device including instructions that, when executed by the at least one processor, cause the computing system to:
      track usage of a plurality of nodes in an allocation tree by a plurality of users, each of the plurality of nodes corresponding to at least one respective computing resource and having an assigned usage allocation for the at least one respective computing resource;
      monitor node processing capacity with respect to the assigned usage allocation being utilized by each of the plurality of users;
      receive a request including identity information for a respective user associated with the request;
      classify the request to correspond to a node of the allocation tree;
      when the corresponding node does not indicate available processing capacity to process the request:
         determine whether the corresponding node is configured to borrow processing capacity from at least one parent node to process the request;
         determine whether the at least one parent node in the allocation tree is able to lend processing capacity to process the request; and
         send the request to at least one respective computing resource when the at least one parent node is able to lend processing capacity to process the request.

2. The computing system of claim 1, wherein the instructions, when executed by the at least one processor, further cause the computing system to:
   determine whether a recent behavior of the respective user exceeds an allowable usage threshold; and
   when the recent behavior exceeds the allowable usage threshold, return a response to the respective user without executing the request.

3. The computing system of claim 1, wherein the instructions, when executed by the at least one processor, further cause the computing system to:
   when the corresponding node indicates available capacity:
      submit the request to the at least one resource to process the request.

4. The computing system of claim 1, wherein the available capacity of the node being based at least in part upon periodic notifications provided by each server of the respective computing resource available to process received requests.

5. The computing system of claim 4, wherein each node of the allocation tree indicates available capacity using a plurality of tokens, each token representing a unit of capacity of the at least one respective computing resource.

6. A computer-implemented method of managing access to at least one resource, comprising:
   under control of one or more computer systems configured with executable instructions,
      tracking usage of a plurality of nodes in an allocation tree by a plurality of users, each of the plurality of nodes corresponding to at least one computing resource and having an assigned usage allocation for the at least one computing resource;
      monitoring an amount of node capacity with respect to the assigned usage allocation being utilized by each of the plurality of users;
      receiving a request to access a respective computing resource from at least one user;
      determining for the request a node in the allocation tree for processing the request;
      when the determined node is not available for processing the request:
         determining whether the determined node is configured to borrow processing capacity from at least one parent node; and
      when the determined node is configured to borrow capacity:
         determining whether the at least one parent node is available for processing the request; and
      when the at least one parent node is available for processing the request:
         allowing the at least one user access to the respective computing resource.

7. The computer-implemented method of claim 6, wherein at least a portion of the plurality of nodes are virtual nodes that enable users to receive an allocation of the respective computing resource for a period of time, each virtual node being discarded after a period of inactivity.

8. The computer-implemented method of claim 6, wherein the at least one user includes at least one of an end user, service, or application.

9. The computer-implemented method of claim 6, wherein the at least one user includes at least a user initiating the request and any intermediate service forwarding the request.

10. The computer-implemented method of claim 6, further comprising:
    when the node is available for processing, granting access to the respective computing resource.

11. The computer-implemented method of claim 10, wherein submitting the request comprises sending the request in parallel to each of a plurality of instances associated with the respective computing resource, and further comprising:
    collating results from the plurality of instances; and returning the collated results to the at least one user in response to the request.

12. The computer-implemented method of claim 6, further comprising:
when access to the respective computing resource is granted, storing behavior information for the at least one user including at least an amount of capacity of the respective computing resource needed to process the request, behavior information for the at least one user being stored for each received request for a determined period of time.

13. The computer-implemented method of claim 12, further comprising:
determining whether a recent behavior of the at least one user exceeds an allowable usage threshold based at least in part upon the stored behavior information; and
when the recent behavior exceeds the allowable usage threshold, returning a response to the at least one user without executing the request.

14. The computer-implemented method of claim 6, wherein the assigned usage allocation for each node is a percentage or fraction of a current capacity of the respective computing resource, the current capacity being determined at least in part based on periodic notifications provided by the respective computing resource.

15. The computer-implemented method of claim 14, wherein the periodic notifications provided by each resource comprise heartbeat messages sent at substantially regular intervals, each heartbeat message including at least capacity information for the respective computing resource.

16. The computer-implemented method of claim 6, wherein the plurality of nodes in the allocation tree indicate available capacity using a plurality of tokens, each token representing a unit of capacity of the respective computing resource.

17. The computer-implemented method of claim 16, wherein the unit of capacity of the respective computing resource includes at least one of an amount of processing capacity, processor utilization, memory capacity, I/O resources, disk capacity, resource connections, threads, processes, or system-level resources.

18. A non-transitory computer-readable storage medium storing instructions that, when executed by a processor, cause the processor to:
track usage of a plurality of nodes in an allocation tree by a plurality of users, each of the plurality of nodes corresponding to at least one computing resource and having an assigned usage allocation for the at least one computing resource;
monitor an amount of node capacity with respect to the assigned usage allocation being utilized by each of the plurality of users;
receive a request to access a respective computing resource from at least one user;
classify the request to correspond to a node in the allocation tree for processing the request;
when the node does not indicate available capacity to process the request:
determine whether at least one parent node in the allocation tree is able to lend capacity to process the request when the corresponding node is configured to borrow capacity from the at least one parent node; and
when the at least one parent node is able to lend capacity to process the request:
allowing the at least one user access to the respective computing resource.

19. The non-transitory computer-readable storage medium of claim 18, wherein the instructions when executed by a processor further cause the processor to:
when the corresponding node indicates available capacity to process the request, grant access to the respective computing resource.

20. The non-transitory computer-readable storage medium of claim 19, wherein the instructions when executed by a processor further cause the processor to:
when access to the respective computing resource is granted, store behavior information for the at least one user including at least an amount of capacity of the respective computing resource needed to process the request, behavior information for each user being stored for each received request from the at least one user for a determined period of time.

* * * * *